United States Patent [19]
Collins, III et al.

[11] 4,053,929
[45] Oct. 11, 1977

[54] CONTOUR FITTING PICTORIAL TRACKING GATE

[75] Inventors: Robert H. Collins, III; William J. Steele; Albert L. Thomas, Jr., all of Birmingham, Ala.

[73] Assignee: The United States of America as represented by the Secretary of the Army, Washington, D.C.

[21] Appl. No.: 815,517

[22] Filed: Apr. 7, 1969

[51] Int. Cl.² .............................................. H04N 7/18
[52] U.S. Cl. ............................... 358/126; 250/203 CT
[58] Field of Search .................... 315/10; 244/3.16; 89/41.7 L; 343/6 TV; 178/6.8; 250/203 CST, 203 CT; 358/126

[56] References Cited
U.S. PATENT DOCUMENTS

| 3,257,505 | 6/1966 | Van Wechel | 178/6.8 |
| 3,507,991 | 4/1970 | Scotchie et al. | 178/6.8 |

Primary Examiner—Maynard R. Wilbur
Assistant Examiner—T. M. Blum
Attorney, Agent, or Firm—Nathan Edelberg; Robert P. Gibson; Robert C. Sims

[57] ABSTRACT

The tracker tracks on a center of contrast on a selected target while tracking gates are adjusted automatically to fit the target contrast area's shape and size. The appropriate bright or dark contrast detector is adjusted to allow discrimination of the target contrast from its background, thus allowing a tracking window to encompass the selected contrast area. Orthogonal error signals are provided for servoing a vidicon camera to maintain the viewed field centered on the target.

10 Claims, 16 Drawing Figures

Robert H. Collins, III
William J. Steele
Albert L. Thomas Jr.,
INVENTORS.

CONTOUR FITTING PICTORIAL TRACKING GATE

BACKGROUND OF THE INVENTION

The conventional way to track a discrete object is to convert the image of that target to electrical signals by a detector such as a vidicon. In the prior art the tracking circuits have been activated for a time corresponding to a rectangular area which included the selected target. Normally, a rectangular area will not closely fit an odd-shaped target and will include some background area. This may permit the tracking of the original target to be overcome by some pictorial element of the background. Therefore, there is a need for the present invention which prevents background details from having any affect on the tracking action by opening the tracking circuits just during the time the pictorial signal represents a coherent area on the selected object.

SUMMARY OF THE INVENTION

A vidicon camera tracks the target and provides video signals therefrom. Vertical and horizontal centerline marker pulses are derived when deflection voltages equal position voltages. A short burst of pulses at the coincidence of the centerlines selects the reference video potential by clamping the video signal to ground. Contrast comparators respond when the video signal departs, either upward or downward, more than an adjustable amount from the centerline selected value. Comparator outputs are nonexclusively combined so that the tracking circuits respond in the same sense to either polarity of contrast. A vertical gate adjusts to the innermost target boundaries coincident with the X horizontal position centerline pulse. Tracking in the vertical direction is accomplished in the following way: an upper half gate and a lower half gate are generated by combining the upper gate boundary with one centerline half-signal and the other centerline half-signal with the lower gate boundary. These half gates are then used to adjust the vertical position of the horizontal centerline until the half gates include an equal number of scanned lines of target, regardless of the width of the selected target on any line. The whole vertical gate activates edge trackers that follow the innermost contrast boundary on either side of the center line. A potential representing the left edge (early edge) is initially just less than that of centerline, and it produces two equal and opposite switching signals when it is compared with the rapid sweep signal. These signals are combined to generate an early edge marker pulse, and one of the switching signals is used to turn on an early gate that is then turned off by the centerline comparator. The edge marker pulse samples direct or positive video, and the early gate samples an inverted video signal. These samples are then added in an integrator that produces the potential that determines the width of the early gate. The short sample of positive video drives the early edge outward until the first edge of contrast is found. Then the early gate passes some portion of the inverted video signal, and the two samples become equal in energy when the edge marker is coincident with the contrast signal. Similar action puts a mark on the right side of centerline and adjusts it to follow the innermost right-hand edge of selected contrast. Horizontal tracking is accomplished by having the early and late gates sample the positive video signal, then the samples are equated in an integrator device. Because the samples are not coincident but sequential, a small triangular pulse results. The maximum useful slope of integration corresponds to one-half the scanning beam slope; lesser slopes of integration are used on less rapidly moving targets. Because the edge trackers adjust to the edges of the selected contrast contour on a line-by-line basis, the centerline follows the horizontal center of the target, line-by-line. The maximum allowable tracking error is one-half the target width per slow scan (1/60 sec). In other words, the centerline must intercept one edge of the target after the target moves between scans. Horizontal tracking is discontinued at the center of the gate because the bottom edge of the selected image detail might be off to the side of the center. A servo unit is connected to receive the centerline signals and to guide the vidicon camera so that it will track the target.

DESCRIPTION OF THE PREFERRED EMBODIMENT

Figure 1:
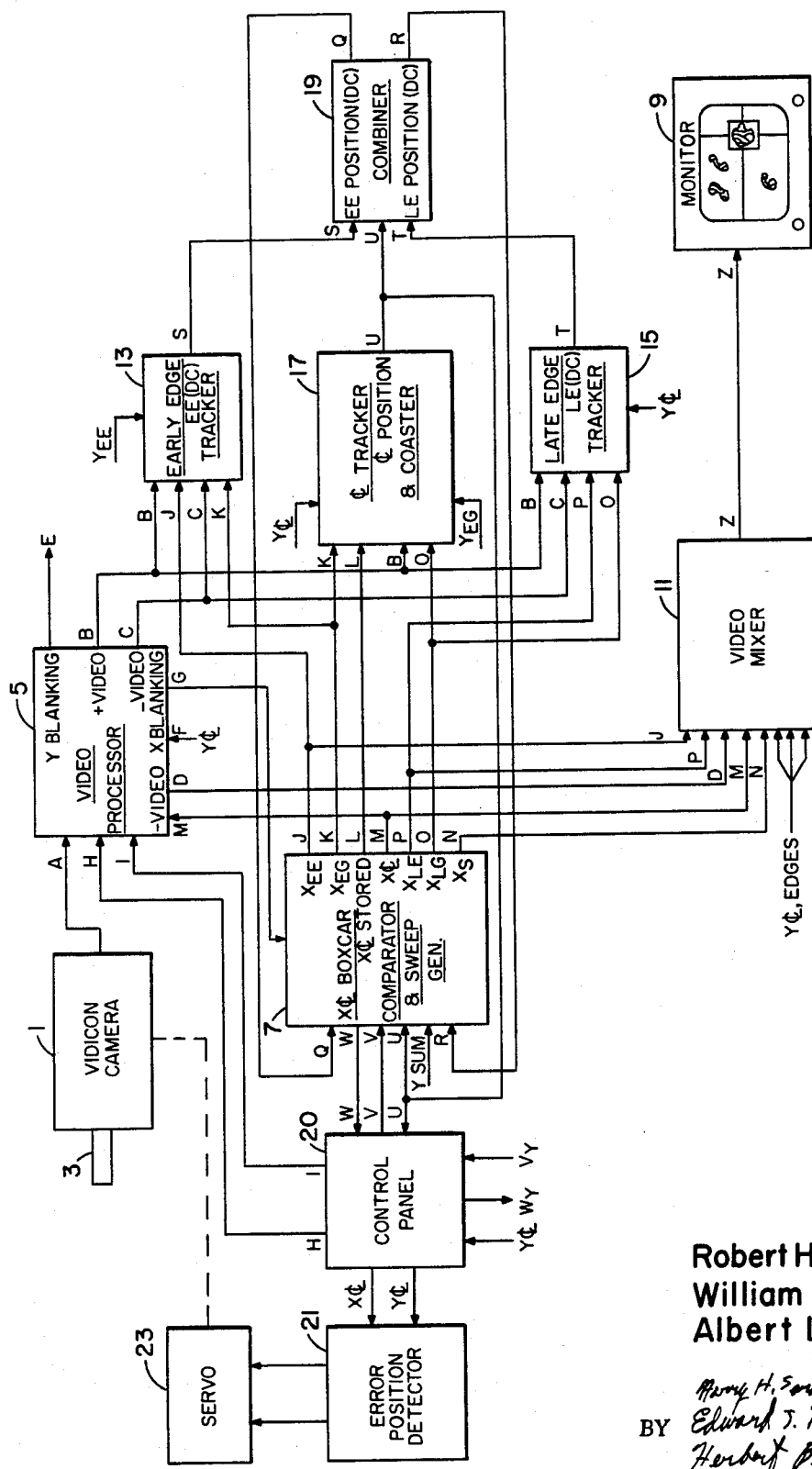
FIG. 1 illustrates a system in block diagram in accordance with the invention.

FIG. 1 shows the tracking circuits for the X axis of the invention. The Y axis tracking circuits, in block form, are the same; therefore they are not shown. A vidicon camera 1, such as a General Electric television camera (Model 4TE15B5), is provided with a lens 3, such as a Zoomar Mark X zoom lens with a remote control unit, not shown. The flow of information through the X set of the tracking circuits is outlined by FIG. 1. Video signals A from camera 1 is brought to the video processor 5 where it is amplified, clamped to ground during the simultaneous occurrence of X and Y centerlines, and discriminated. The resulting saturated video signals are used for tracking. Blanking pulses are derived from the video signals; these signals are used at the comparator boards 7 for the generation of a sawtooth wave sweep of six volts amplitude. Tracking gates are generated by selective recombination of the switching signals derived from the comparison of the edge and centerline positional voltages with the generated sweep signal. These gates, in conjunction with the discriminated video signals, are used by the edge trackers 13 and 15 to adjust the tracking window and by the centerline tracker 17 and combiner 19 to maintain the crosshairs of monitor 9 at the center of the target. A video mixer 11 adds the centerline and edge marker pulses to the pictorial signal to render the tracking action visible on the monitor. The X and Y centerline positions are sent through control panel 20 and error position detector 21 to a servo motor 23 so as to servo the camera to maintain the view field centered on the target.

Figure 2:
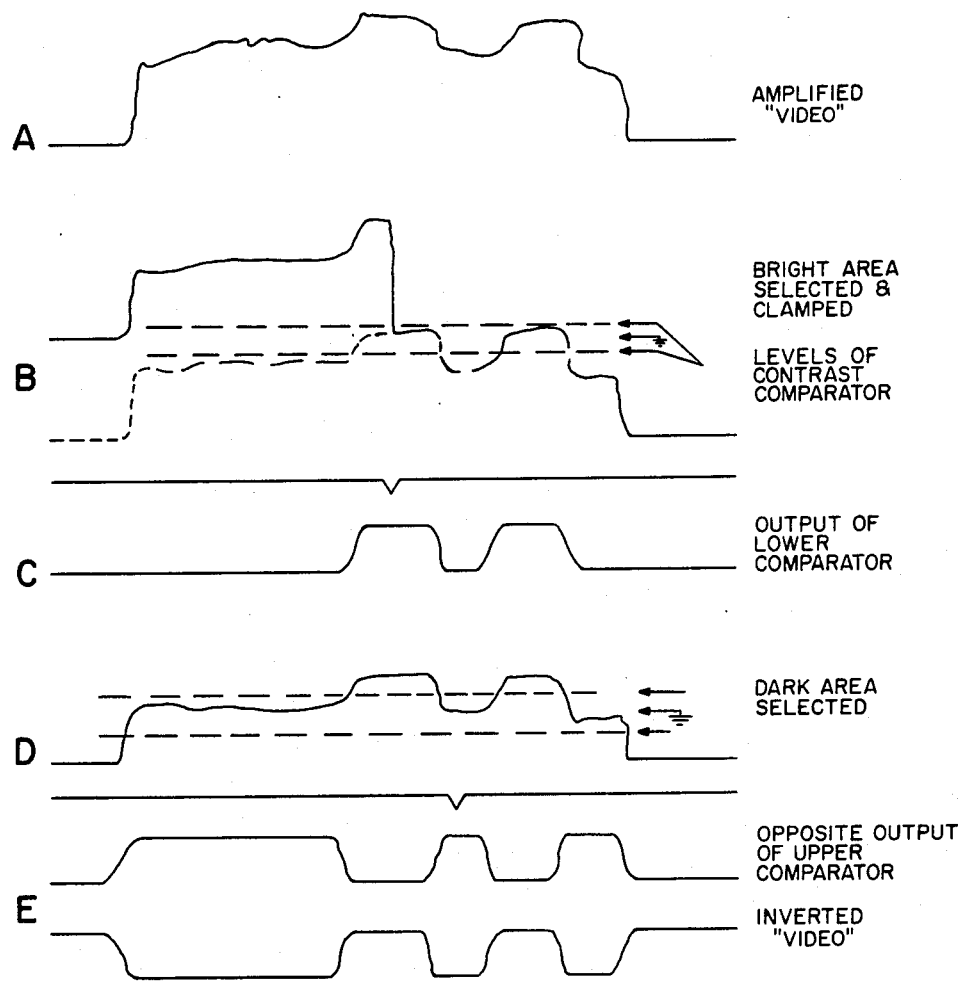
FIG. 2 illustrates waveforms of the video and the comparators of the present invention.

As a whole, the tracking circuits shown in FIG. 1 accomplish the following general functions. Centerline marker pulses are derived when deflection voltages of the vidicon equal position voltages. FIG. 2 shows how a short burst of pulses at the coincidence of the vertical and horizontal center lines selects the reference video potential by clamping that video signal to ground. Contrast comparators are provided to respond when the video signal departs either upward or downward by an adjustable amount from the centerline value selected. The comparators outputs are nonexculsively combined so that the following circuits respond to either polarity of contrast in a like manner.

Figure 3:
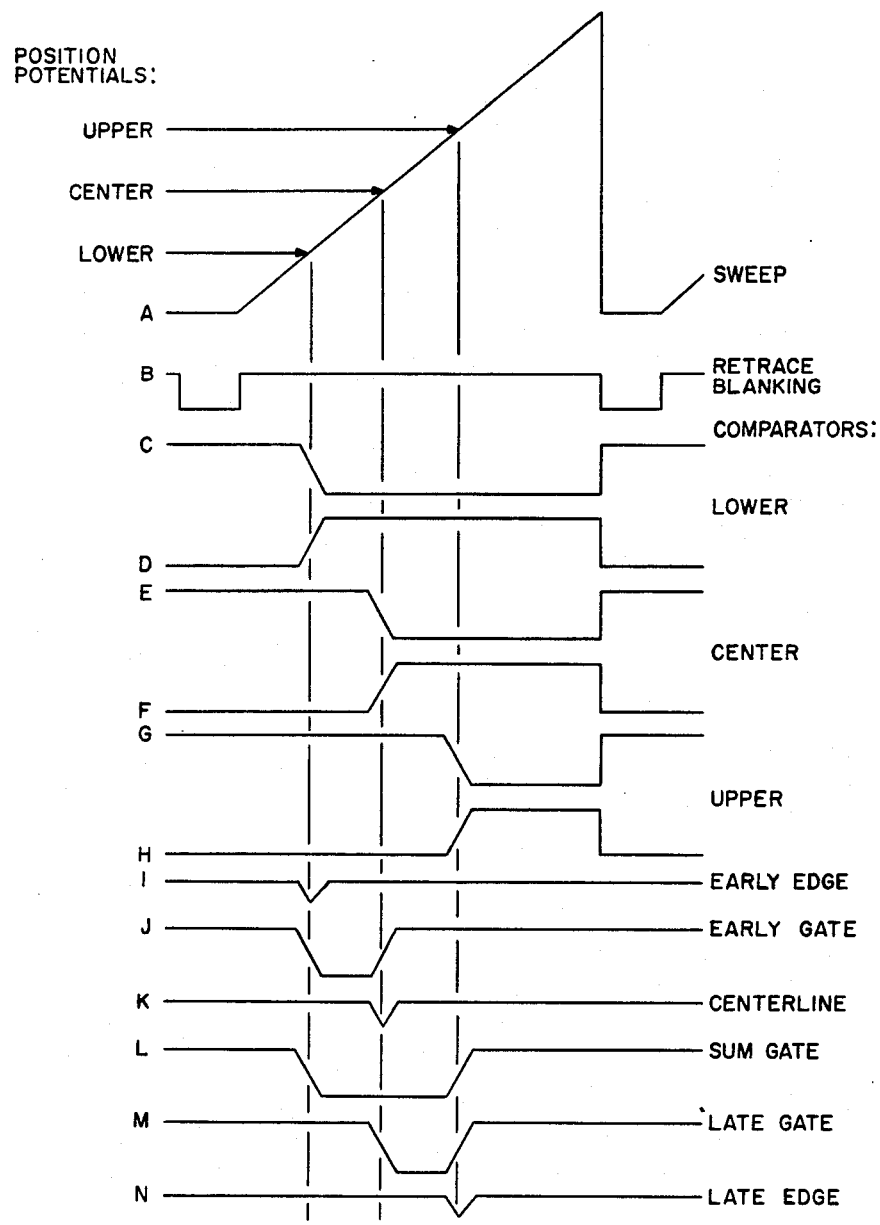
FIG. 3 illustrates typical tracking circuit waveforms of the present invention.
Figure 4:
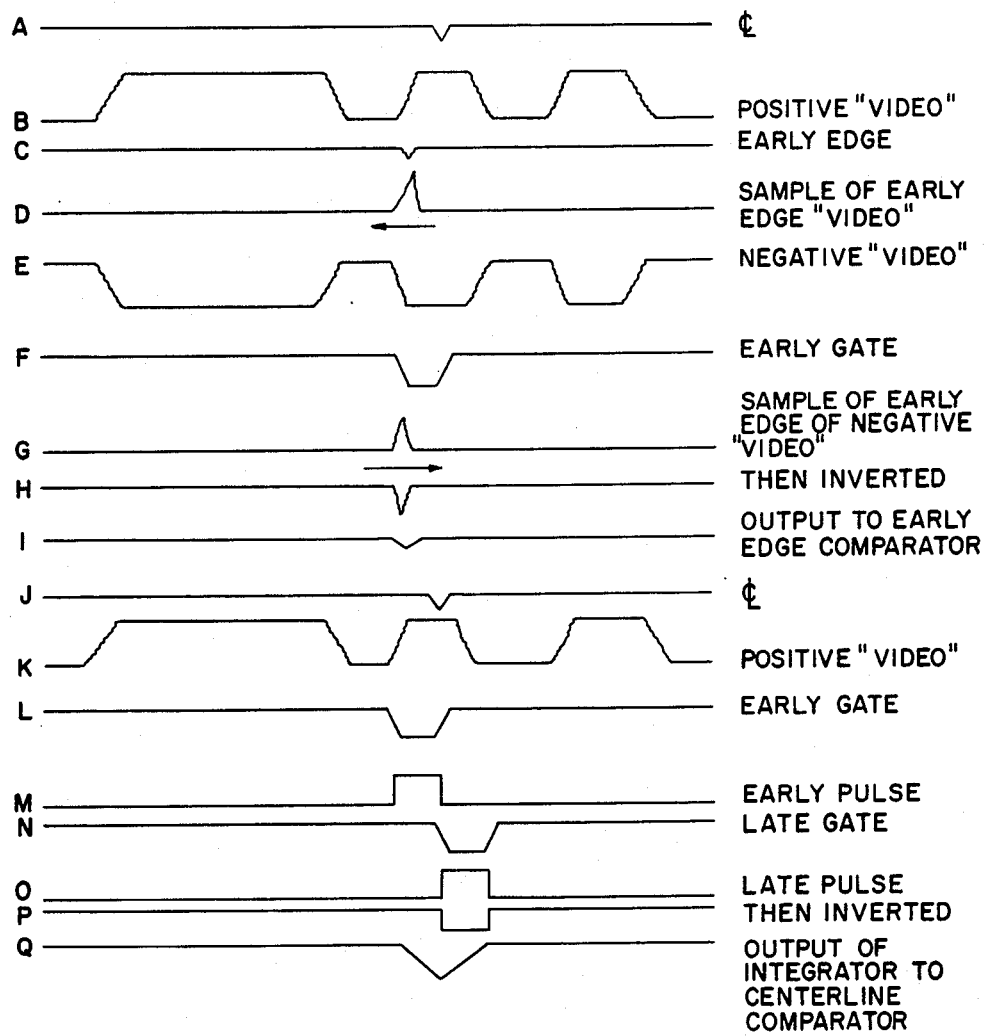
FIG. 4 illustrates the video and tracking gate waveforms of the invention.

There is provided a vertical gate which adjusts to the innermost target boundaries coincident with the X centerline pulse, which produces the vertical line on the monitor. Tracking in the vertical direction is accomplished in the following way: An upper half gate and a lower half gate are generated by combining the upper gate boundary with one centerline half signal and the other centerline half signal with the lower gate boundary. These half gates are then used to adjust the vertical position of the horizontal center line until the half gates include an equal number of scanned lines, regardless of the width of the selected target on any line. The whole vertical gate activates the edge trackers that follow the innermost contrast boundary on each side of the centerline. FIG. 3A shows that potentials representing the edge positions are initially just less for the early edge and greater by an adjustable amount for the late edge than those of the centerline. They produce equal and opposite signals (FIGS. 3C and D, E and F, G and H) when compared with the rapid sweep signal. For the early edge these signals are used to generate an early edge marker pulse, FIG. 3I, and one of them is used to turn on an early gate, FIG. 3J, which is then turned off by the centerline comparator. The early edge marker pulse, FIG. 4C, samples direct or positive processed video, FIG. 4B, and the early gate, FIG. 4F, samples an inverted video signal, FIG. 4E. These samples, FIGS. 4D and 4H, are then added in an integrator which produces the potential that determines the width of the early gate. The short sample of positive video drives the early edge outward until the first edge of contrast is found. The early gate finds some signal in the inverted video and the two samples become equal in energy. Similar action puts a mark on the right side of the centerline and adjusts it to follow the innermost edge of the selected contrast. The edge trackers are designed to step as much as five percent of the field per line.

Horizontal tracking is accomplished by having the early and late gates, FIGS. 4L and 4N, samples the positive video signal, FIG. 4B, and then equating the samples in an integrator. Because the samples are not coincident but sequential, a small triangular pulse results, FIG. 4Q. This pulse is fed to the centerline comparator to accomplish centerline tracking. The maximum useful slope of integration and therefore the maximum horizontal tracking rate correspond to one half of the scanning beam slope. Because the edge trackers (13 and 15 of FIG. 1) adjust to the sides of the selected contrast contour line by line (FIG. 2), the centerline follows the center of the target line by line. This tracking rate is extremely fast, therefore, the maximum overall tracking rate is one half the target width per slow scan (1/60 sec). In other words, the center line must intercept one edge of the target after the target moves between scans.

Figure 5:
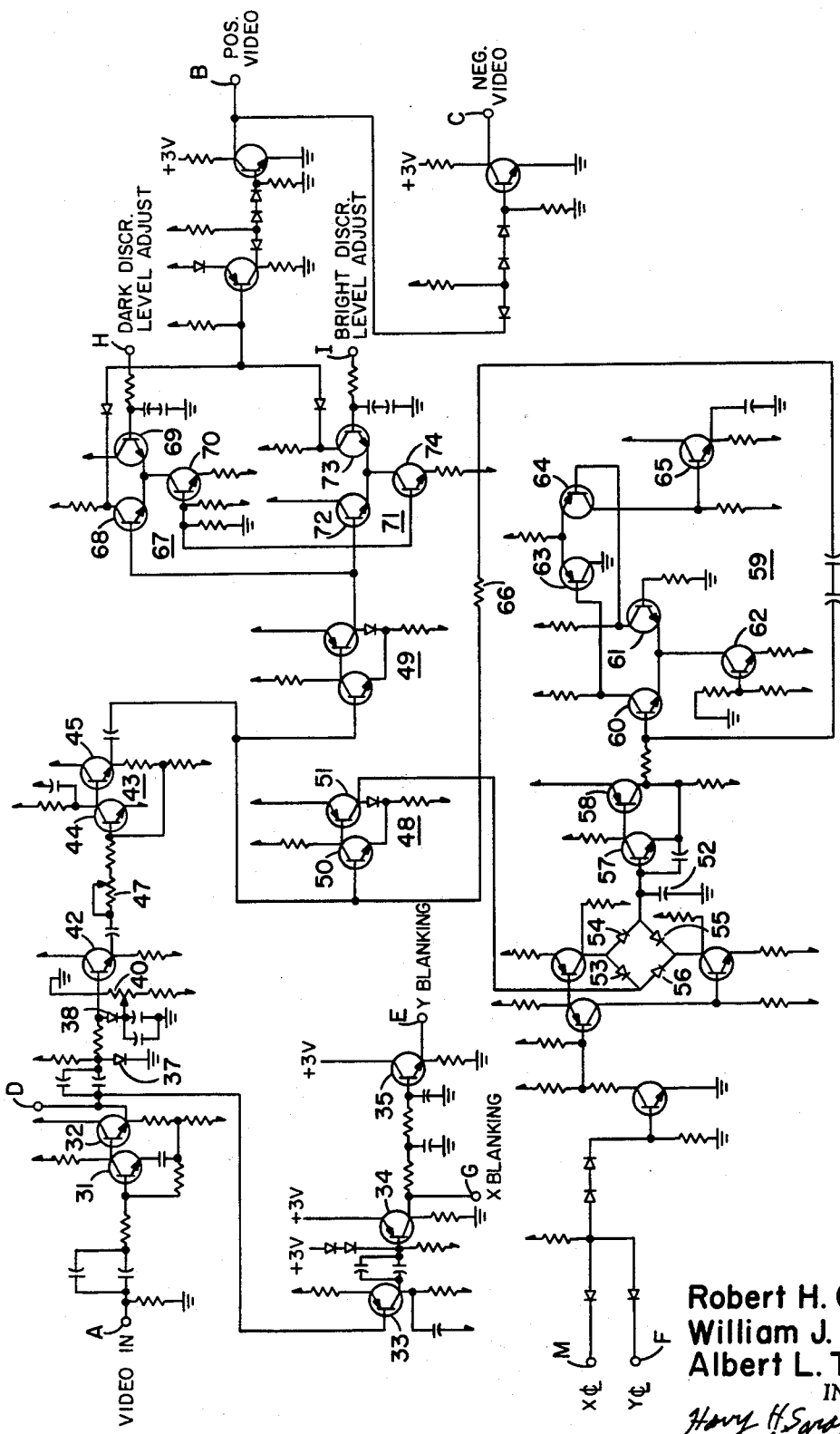
FIG. 5 shows a schematic diagram of the video processor.

The output and input lines of the blocks in FIG. 1 have been labeled so as to enable one to understand how the specific circuit diagrams, which are also similarly labeled, of each block are used in the whole system. The half arrows of FIGS. 5–16 indicate a 12 volt dc supply. Up pointing arrows are (+), and down pointing arrows are (−). The specific circuit which could be used for the video processor 5 is shown in FIG. 5. Video signals A from the vidicon camera are amplified and invented by transistors 31 and 32 and their associated circuits. X and Y blanking signals are separated from these amplified signals by the circuits containing transistors 33, 34, and 35. The output of amplifiers 31 and 32 is clamped by diode 37 and clipped by diode 38. The clipping level is adjusted by means of a resistor 40 to remove the blanking signals without distorting the video information. Emitter follower 42 drives an inverting amplifier 43 consisting of transistors 44 and 45. The gain of amplifier 43 should be adjusted by resistor 47 to provide an output signal of six volts peak-to-peak. This amplifier is capacitively coupled to two compound-complementary emitter followers 48 and 49 which drive a sampling switch and the video discriminators with identical but isolated signals. Transistors 50 and 51 provide a sampled video level to a storage capacitor 52 when diodes 53–56 are driven into conduction during the simultaneous occurrence of X and Y center lines. The stored d-c level of capacitor 52, buffered by transistors 57 and 58, provides drive to an integrating amplifier 59 consisting of transistors 60–65. The output of integrator 59 controls the d-c level of the coupled video signal by means of resistor 66. In this manner, the d-c level of the video signal is servoed to allow the video signal during X and Y centerlines to have a d-c level of ground. The time constant of this level setting circuit is such as to permit rapid acquisition of targets. The level of the servoed video signal is sensed by a dark video discriminator 67 having transistors 68–70 or by a bright video discriminator 71 having transistors 72–74. Adjustments resistors 314 and 315 on a control panel, shown in FIG. 16, allow the operator to control the discrimination point by way of inputs H and I. The discriminators drive saturating switches to provide positive and negative video gating pulses.

Figure 6:
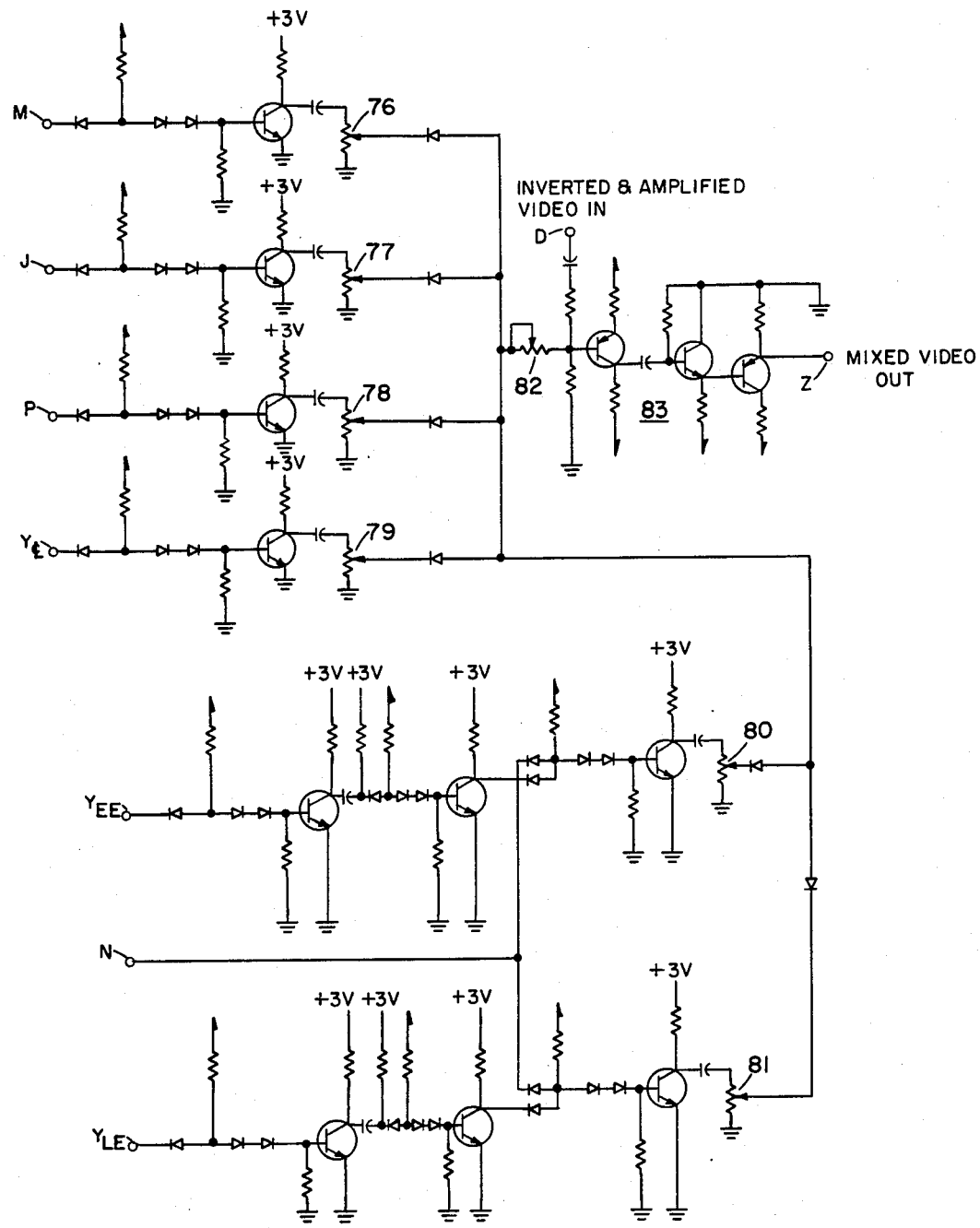
FIG. 6 is a schematic diagram of the video mixer.

The video mixer is shown in detail by FIG. 6. The X and Y edge signals and the X and Y centerline signals are differentiated, and the leading edge is added to the video signal to provide a visual indication of the position of the tracking window and the tracking centerline on the monitor. The relative brightness of the edge and centerline markers is controlled by resistors 76–81, and the composite marking level is adjustable by resistor 82. The output of the video mixing amplifier 83 is connected to the monitor by an external co-axial cable, not shown.

Figure 7:
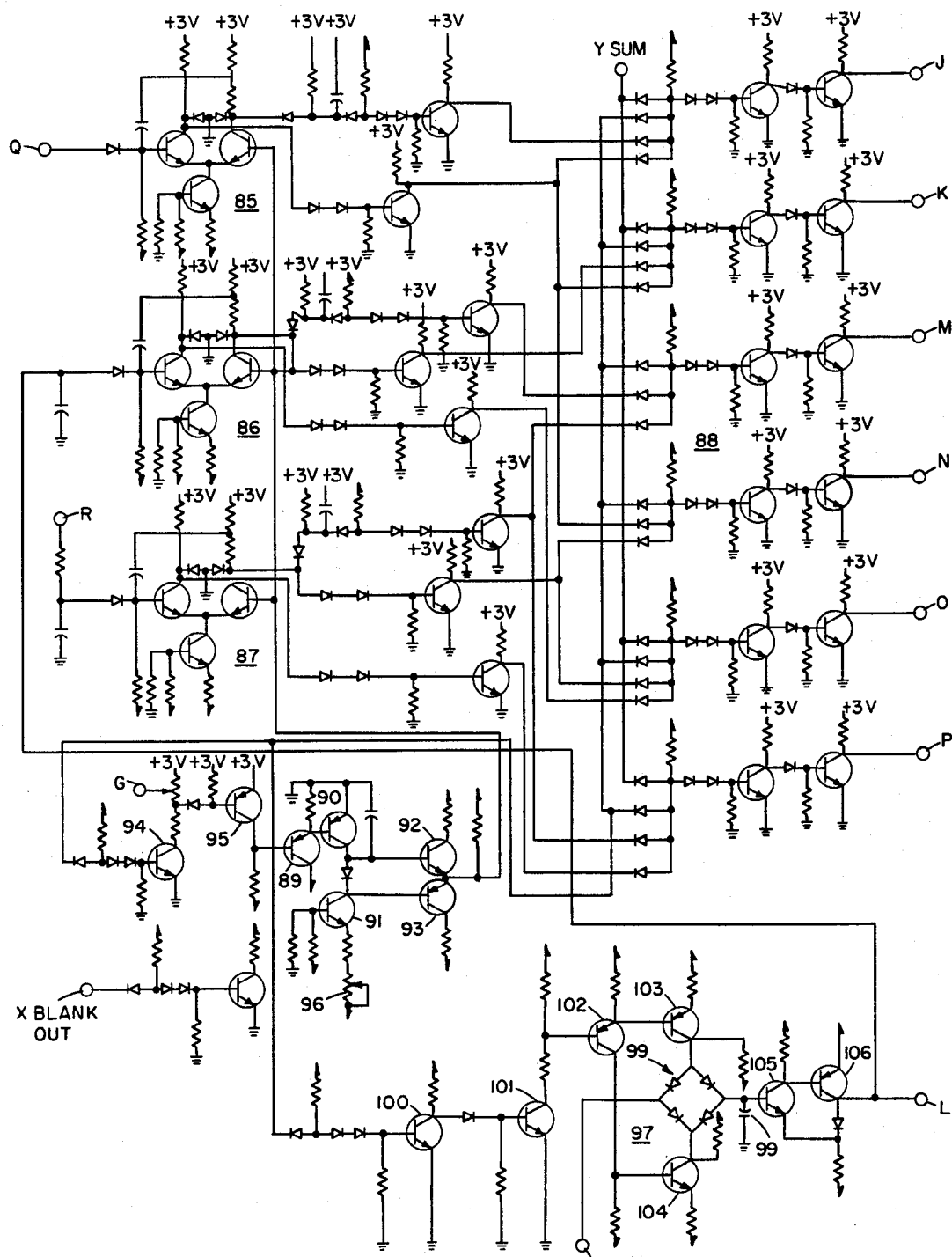
FIG. 7 is a schematic diagram of the X comparator circuits of the present invention.
Figure 8:
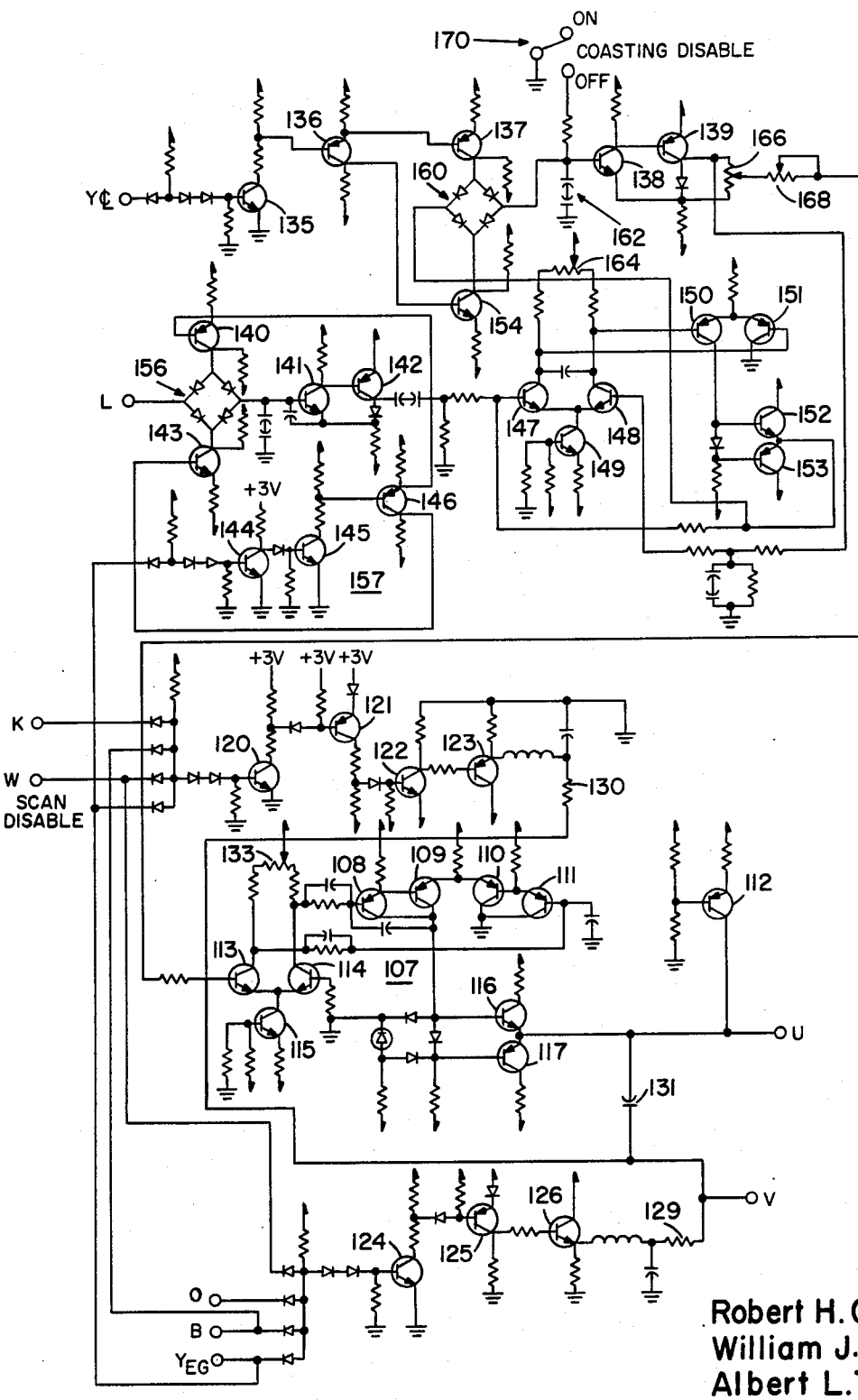
FIG. 8 shows a schematic diagram illustrating the X centerline tracker and coasting circuit of the present invention.

The comparator boards 7 (FIG. 1) are shown in specific detail by FIG. 7. The tracking gates are generated by combining the outputs of appropriate Schmitt triggers which act as d-c level sensors. Three Schmitt triggers 85, 86, and 87 are available to provide early edge, centerline, and late edge positional signals. The conducting state of the Schmitt trigger is changed when the d-c level from the appropriate tracker is approached by the generated sawtooth. The comparator outputs are combined by saturating diode-transistor circuits 88 to provide the early, late, and sum gates. Outputs from the discriminator are also delayed before being gated to provide a finite sampling time for the early edge, centerline, and late edge gates. A linear sawtooth is generated by transistors 89–93. The generated ramp voltage is reset to ground during the blanking interval by transistors 94 and 95. The sawtooth amplitude is set at a negative 6-volt peak by resistor 96.

A boxcar circuit 97 is provided to isolate the centerline tracker from the centerline comparator during the tracking interval. The storage capacitor 98 is reset with the computed centerline position during the blanking interval through the diode switch 99. Diode switching drive is derived from transistors 100–104. The stored d-c level, buffered by transistors 105 and 106, is used as a predicted centerline position by the comparators. An X blanking signal, used for switching synchronization of Y centerline, is available as a portion of the collector signal of transistor 94. The centerline tracker, coaster, and position circuits 17 (FIG. 1) are shown in specific detail in FIG. 8. The center line tracker is an integrating amplifier 107 consisting of transistors 108–117. The output d-c level "U" of this circuit determines the position of X centerline. Tracking signals are derived by gating positive video by the X early and late gates during the Y early gate. These signals cause the tracker to alter its output level on a line-by-line basis so as to place the centerline position midway between the early and the late edge of the gated target. Positive video signals occurring during the second quadrant of the tracking window are gated by transistors 120–123. These signals generate negative pulses at the input of the tracking integrator and drive the output of the integrator positively in a ramp fashion. Positive video is gated during the first quadrant of the tracking window by transistors 124–126. These signals appear as positive input pulses and drive the output of integrator 107 negatively in a ramp fashion. The resulting triangular tracking waveform, superimposed upon the stored d-c level of the integrator, will be symmetrical only if an equal amount of video is present during the X early and late gates. Unequal gating intervals create an unsymmetrical tracking waveform which results in a corrected centerline position. The time constant of the integrator, and hence the lateral tracking rate, is determined by the input resistors 129 and 130 and capacitor 131. Ideally, the tracking rate should be equal to that of the sweeping rate; practically, however, less than half of this rate is used to reduce centerline jitter caused by video noise. A balance pot 133 is provided for balancing the drift of integrator 107. This adjustment will allow the integrator to maintain the predicted centerline position during a nontracking interval.

Transistors 135–154 and their associated circuits provide a coasting signal which causes the integrator to slew at a rate proportional to the computed velocity. A boxcar circuit 156 and its associated drive 157, consisting of transistors 140, 143, 144, 145, and 146, isolate the centerline signal from the error-sensing circuits during the upper half of the target window. This prevents the generation of false coasting signals from target irregularities. Therefore, only net changes in centerline position from top to center of the target generate coasting signals. Transistors 141 and 142 provide buffering between the storage capacitor and the error-sensing network. The positional error is sensed by a simple differentiating network and is multiplied by a factor of ten by a potentionetric d-c amplifier consisting of transistors 147–153. Transistors 135, 136, 137 and 154 drive diode switch 160 into conduction during the Y centerline gate, allowing storage of the peak error on capacitors 162. This stored error is isolated by the compound-complementary stage transistors 138 and 139. The output of this buffer stage provides the coasting signal; it is also delayed to provide positive feedback to the amplifier for error storage. This potentiometric amplifier is provided with a zeroing control 164. A coasting zero control 166 is provided to allow the coasting voltage be zeroed in the absence of tracking errors. These two adjustments should be made with the selector switch (FIG. 16) in the manual scan position. The coasting gain adjustment of resistor 168 should be made while observing the output of the centerline tracker while tracking a target undergoing periodic motion. The coasting circuits may be disabled by the switch 170.

Figure 9:
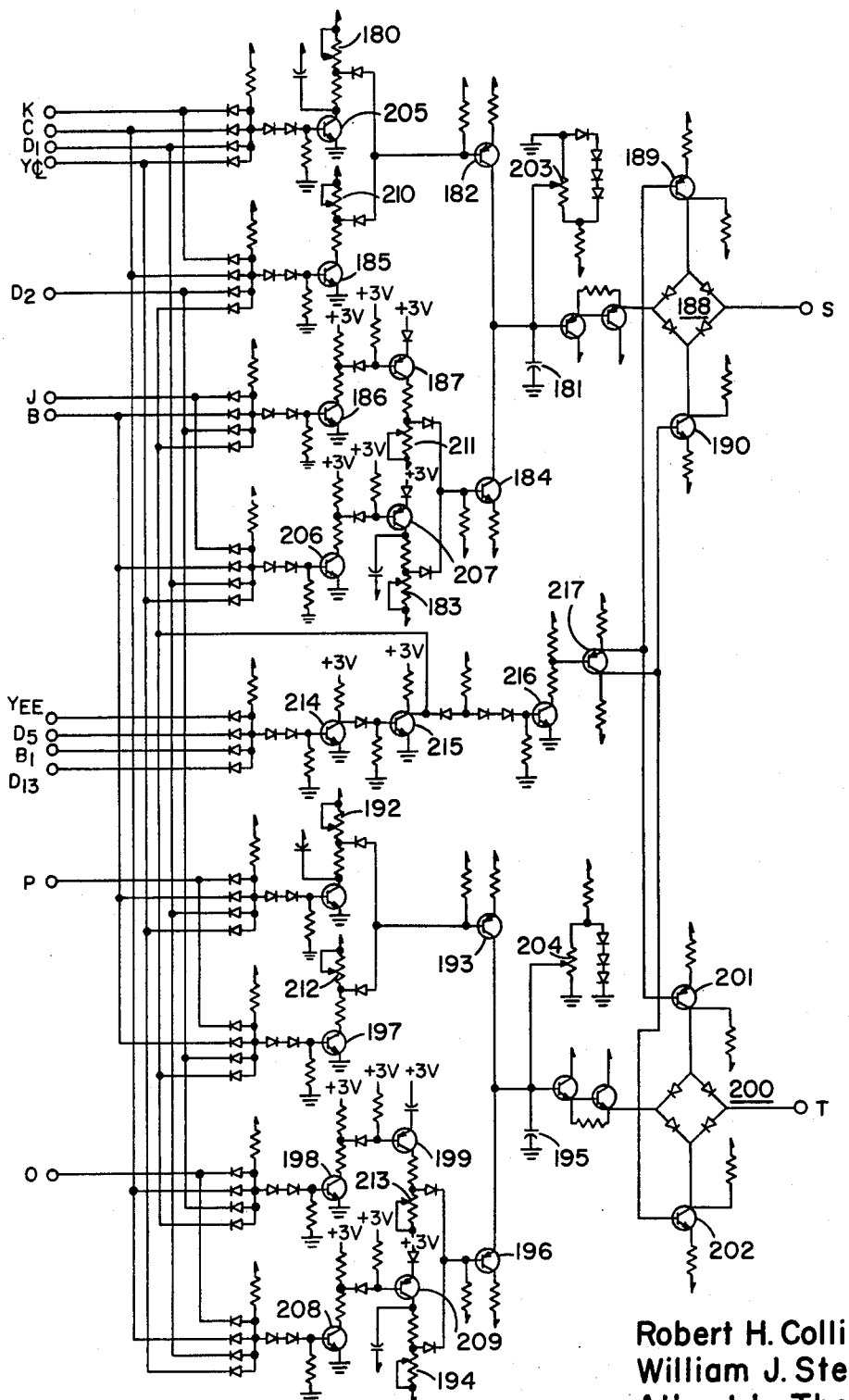
FIG. 9 is a schematic diagram of unit one of the X edge trackers.
Figure 10:
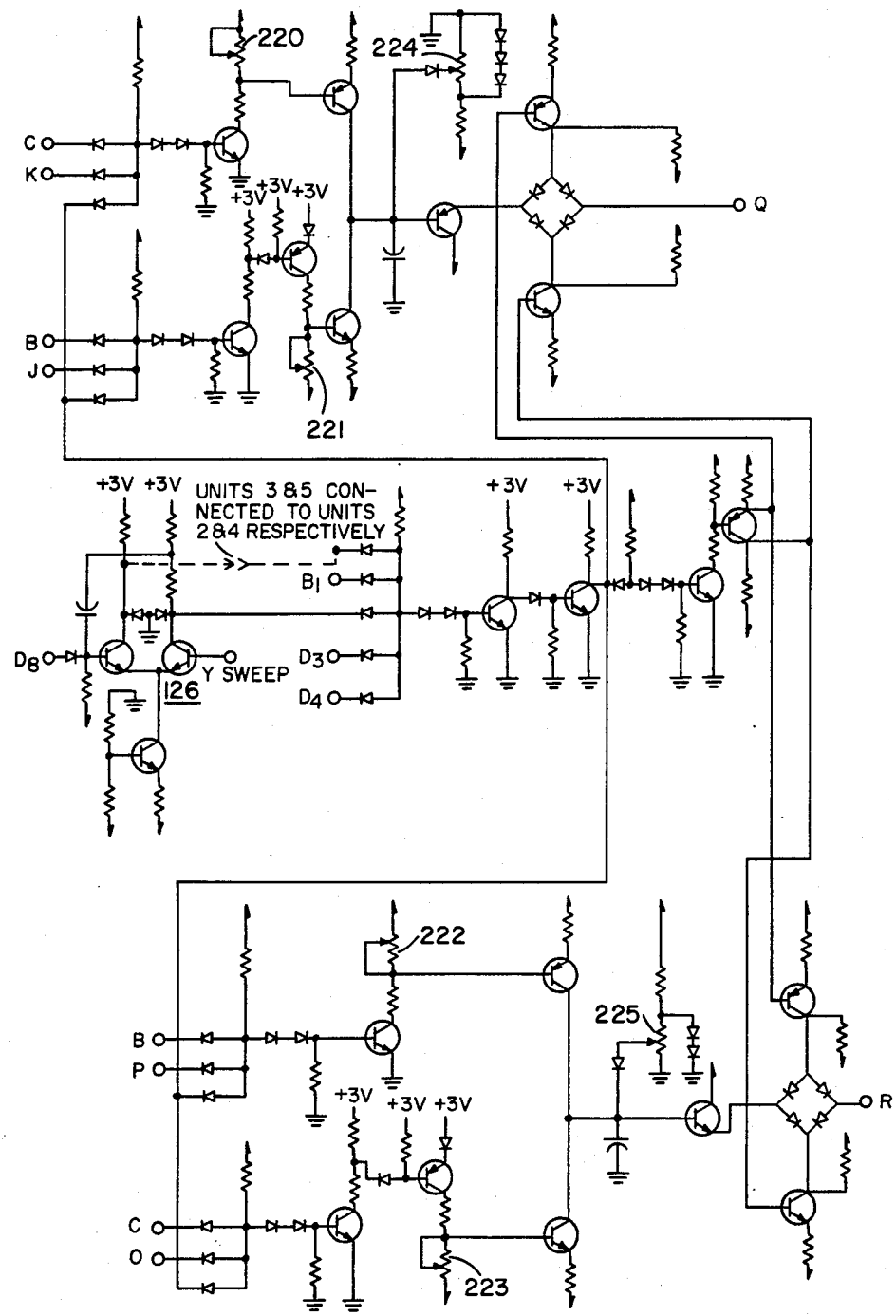
FIG. 10 is a schematic diagram illustrating the circuits of units 2–6 of the X edge trackers.

FIGS. 9 and 10 show the specific circuitry that make up the trackers 13 and 15 (FIG. 1). Although the trackers are shown as two separate blocks in FIG. 1, their specific circuits are combined. However, the tracker is made up of 6 units. Unit 1 is different from units 2–6 and is shown in FIG. 9. Units 2–6 are almost the same and a generic showing of the units is illustrated by FIG. 10. Both FIGS. 9 and 10 are controlled by and have connections to the switching circuit shown in FIG. 11.

FIG. 9 shows the first unit of the edge trackers. It has two modes of operation: one, when operating alone and another when operating in conjunction with the other units. When operation of a single edge is selected by placing the edge selector switch of FIG. 11 in position E1, the early and late edge of the tracking window will be servoed to a point tangent to the target at the Y centerline. To do this, the early edge is positioned by means of the X early gate K and early edge gate J which sense the presence of positive and negative video during the Y centerline gate. Resistor 180 provides a gain adjustment for the closing of the early gate by controlling the amount of charge deposited in the storage capacitor 181 by transistor 182. Resistor 183 provides a gain adjustment for the opening of the early gate by controlling the charge removed from storage capacitor 181 by transistor 184. The gate closing drive of transistor 185 and the gate opening drive of transistors 186 and 187 are disabled by the connection of the edge selector switch (FIG. 11) at D2. The resulting d-c level on storage capacitor 181 determines the position of the early edge. This potential is sampled through the diode switch 188 which is forced into conduction during the Y sum gate by transistors 189 and 190. The late edge operates similarly to the early edge. Resistor 192 provides a gain adjustment for the opening of the late edge by controlling the amount of charge deposited on storage capacitor 195 by transistor 193. Resistor 194 provides a gain adjustment for the closing of the late edge by controlling the charge removed from the storage capacitor 195 by transistor 196. The opening drive of transistor 197 and the closing drive of transistors 198 and 199 are disabled by the edge selector switch (FIG. 11) by connections at D2. The d-c level of storage capacitor 195, which determines the position of the right edge, is sampled through the diode switch 200, which is driven into conduction by transistors 201 and 202 during the Y sum gate. The minimum size of the early and late gates is adjustable by means of resistors 203 and 204, respectively. The drive adjustments for both the early and late edges should be made on a selected target to achieve the early and late edges of the tracking window tangent to the target at Y centerline. The adjustments for gate closing should be made while observing a selected target in the vicinity of equal contrast. The closing gain should be adjusted to allow the edge trackers to discriminate between the adjacent contrast areas and to move the associated edge to the innermost contrast boundary.

Figure 11:
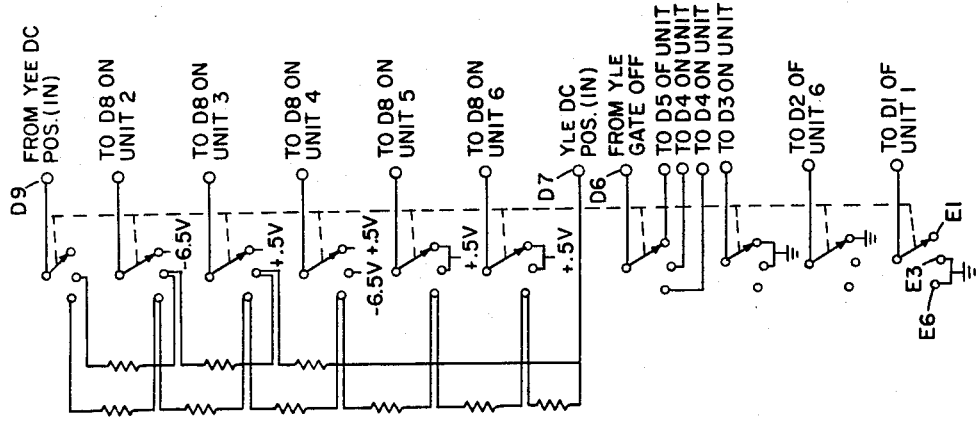
FIG. 11 shows the circuit of the edge selector switch.

Unit 1 will operate different during multiple edge operation (the switch of FIG. 11 being in position E3 or E6). The opening and closing drives of transistors 205-209 are disabled by the edge selector switch by connections at D1. The early edge closing is controlled by resistor 210, and the opening is controlled by Resistor 211. These control the amount of charge deposited and removed from storage capacitor 181. Similarly, resistor 212 provides the gain control for the opening of the late edge, and resistor 213 provides gain control for the closing of the late edge. The minimum size of the early and late gates is controlled by resistors 203 and 204 respectively. These adjustments should be made after turning the discriminator adjustment on the control panel to its most sensitive position. Transistors 214 and 215 restrict the edge tracking interval to that of Y sum and provide readout drive through transistors 216 and 217 to isolating diode switches 188 and 200.

FIG. 10 is a generic showing of units 2-6. The main differences between units 2-6 are their connections to the edge selector switch of FIG. 11. The tracking circuits of units 2-6 are similar to those used in unit 1 with multiple edges selected. Consequently, adjustments of resistors 220-225 are made in the same manner as discussed above. The edge tracking interval is made coincident with the Y sum gate by initiating and terminating the combined edge tracking with outputs of the Y early and late edge comparators. A Schmitt trigger 226 is provided and operates in the same manner as the triggers 85-87 shown in FIG. 7. The Y sum gate is subdivided into the selected number of segments by comparing d-c levels intermediate between the Y early and late edge d-c positions with the Y sweep. The outputs of the comparators are used to start the tracking interval of the associated section and to discontinue that of the preceding unit. Thus, the units are consecutive and do not overlap.

FIG. 11 shows the edge selector switch. One, three, or six X edge tracking units are selected by this switch in its positions E1, E3, and E6 respectively. The switch provides the appropriated d-c levels for segmenting the Y sum interval and disablement of the unselected units. The signal from the Y late edge comparator is applied to the appropriate section to discontinue tracking at the termination of the Y sum gate. The signal from the Y early edge comparator initiates the first unit under all conditions.

Figure 12:
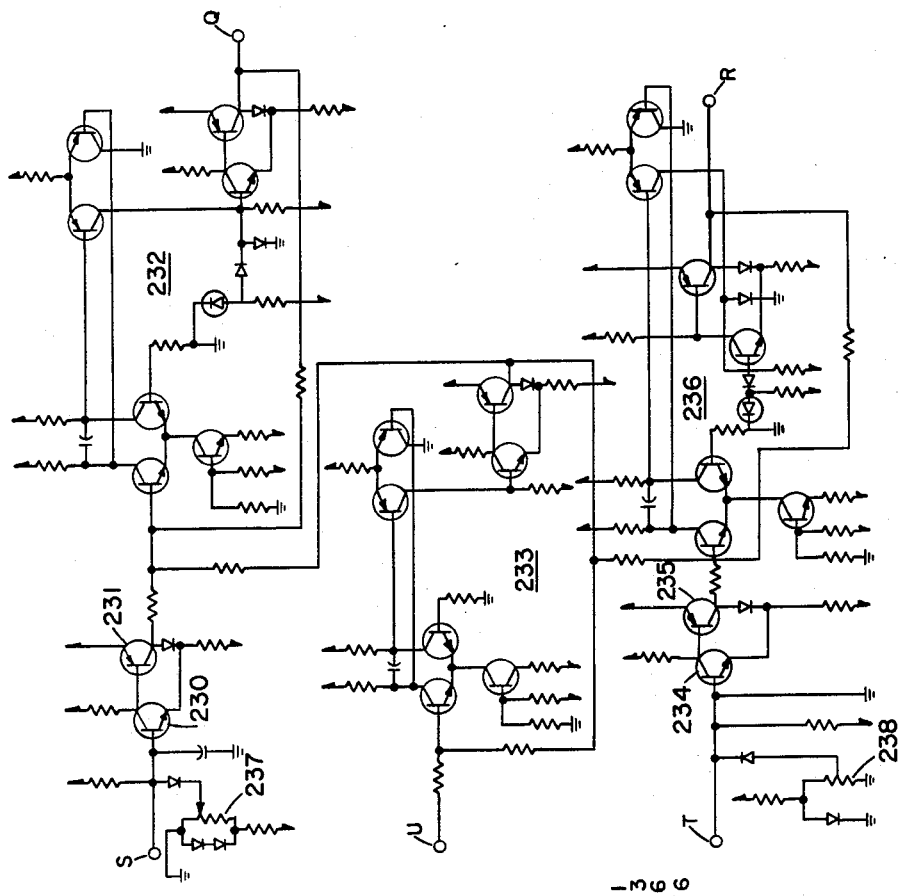
FIG. 12 is a schematic diagram of the X edge readout circuit.

FIG. 12 shows the specific structure of combiner 19 of FIG. 1. The X early and late edges signals are read out of each unit consecutively through their associated diode switches. The composite early d-c level appears on a capacitor and is buffered by transistors 230 and 231 to an operational amplifier 232. Inverted X centerline derived from amplifier 233, also serves as an input to operational amplifier 232. The amplifier thus references the early edge position to that of centerline. The composite late edge is buffered by transistors 234 and 235 and is added to X centerline by operational amplifier 236. The edge positions follow the centerline tracking position and, therefore, have a slow tracking rate since they need only accommodate for changes in target size. Resistors 237 and 238 control the initial width of the tracking window.

Figure 13:
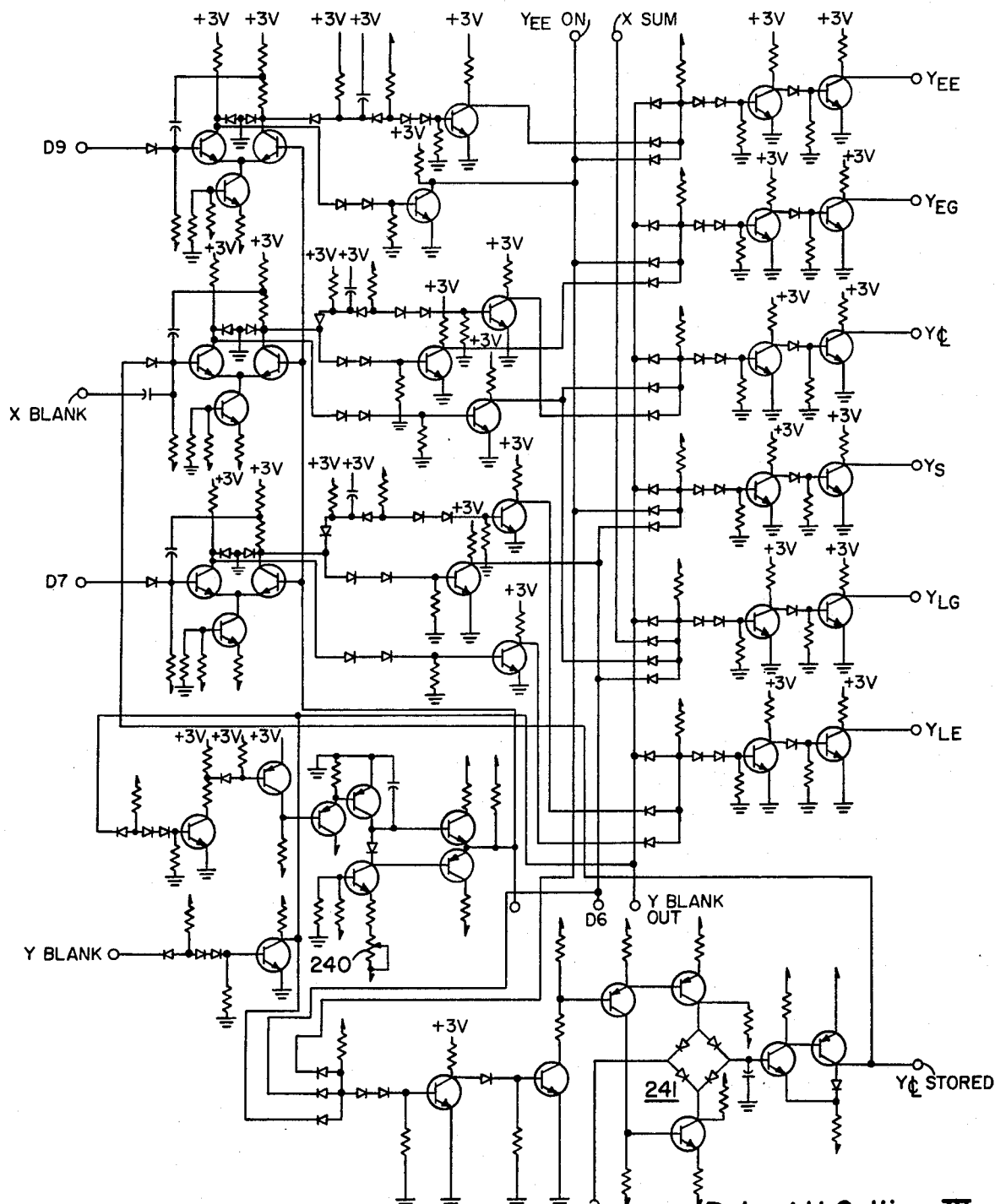
FIG. 13 is a schematic showing of the Y comparator circuits of the invention.

FIG. 13 shows the Y comparator boards in specific detail. Since the basic operation of this circuit is similar to that shown in FIG. 7, only dissimilarities will be discussed. The generated sawtooth wave is adjusted by resistor 240 to have a 0 to −6 volt range. The boxcar circuit 241 serves to isolate the centerline tracker from the centerline comparator during the duration of Y sum gate. The X blanking pulses from the X comparator board are applied to the Y centerline comparator for synchronization. These cause the Y centerline comparator to switch during a nontracking interval. The resulting Y early gate will allow an equal number of early and late driving signals to operate on the X centerline tracker before the tracking interval is discontinued.

Figure 14:
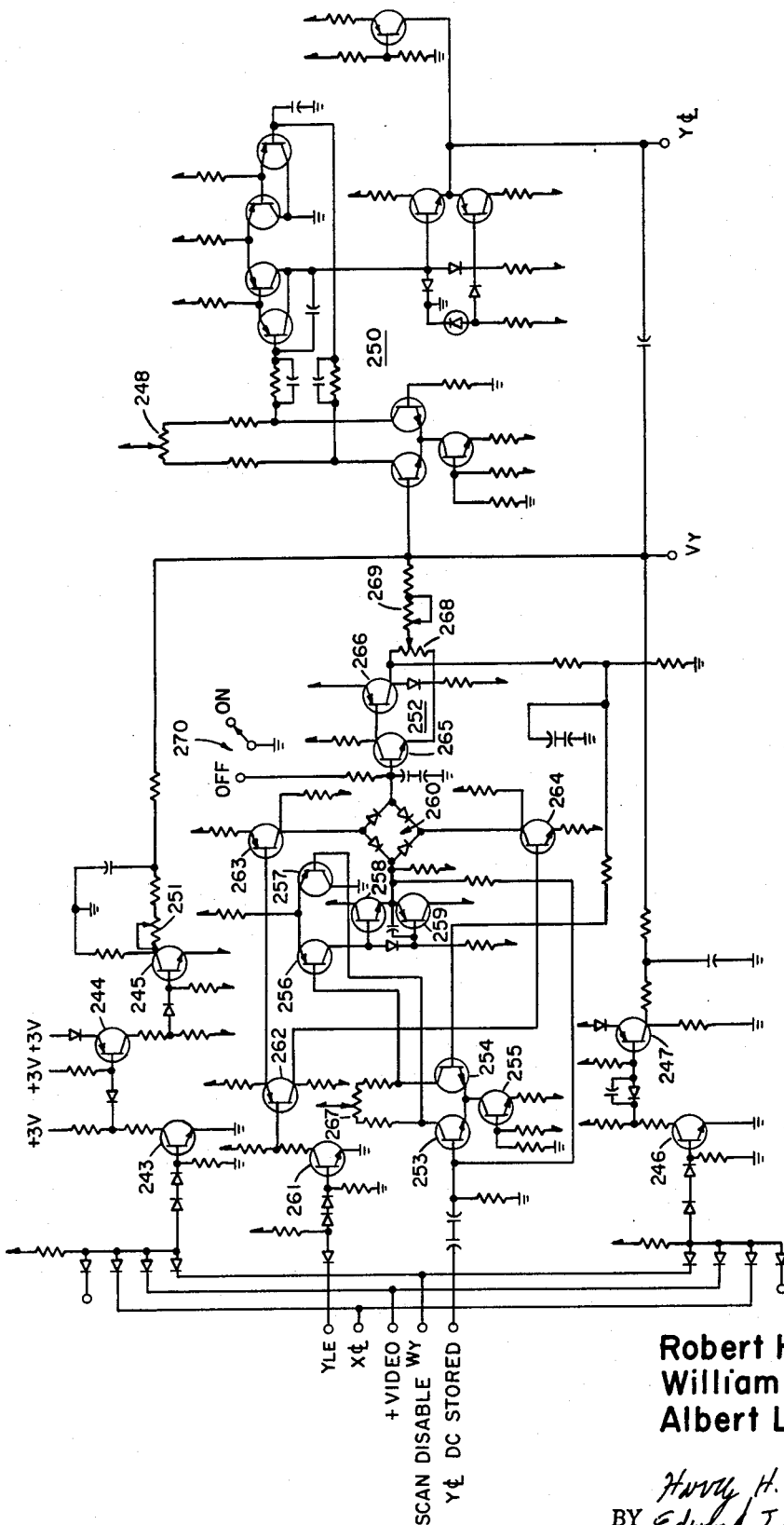
FIG. 14 is a schematic diagram of the Y centerline tracker and coasting circuits.

The Y centerline tracker and coasting circuits are shown in FIG. 14. Y centerline tracking is accomplished by equating the energy in the upper half of the target gated by the X centerline to that in the lower half of the target gated the X centerline. This quasi-line-counting technique results in a Y centerline position equidistant from the top and bottom edges of the target. The simultaneous occurrence of positive video, X centerline, and Y early gate provides negative input pulses to the integrator by means of transistors 243-245. These signals drive the output of the integrator positively in a ramp fashion during each tracking interval. The simultaneous occurrence of positive video, X centerline, and Y late gate drives transistors 246 and 247, causing a positive pulse to appear in the input to the integrator. These signals drive the output of the integrator negatively during each of the tracking intervals. An equal number of pulses during the Y early and late gates will result in no net change in the output d-c level of the integrator which serves as a predicted centerline position for the succeeding frame. A balance pot 248 is provided to compensate for unbalance in the integrator 250. Inequalities of the input drive to the integrator are compensated for by resistor 251. This adjustment allows the Y centerline to be centered on the stationary target being tracked. A coasting circuit is provided to slew centerline position at a rate proportional to the relative target velocity. Target velocities are sensed by detecting the net centerline corrections by means of a differentiating circuit 252. This error is multiplied by a factor of ten by a potentiometric amplifier consisting of transistors 253-259. The error is peak-detected by forcing diode switch 260 into conduction during the Y late edge by means of transistors 261-264. The stored error, buffered by transistors 265 and 266, provides a coasting bias and a positive feedback signal for error storage. The amplifier balance control 267, coasting bias zero control 268, and coasting gain control 269 are adjusted in the same manner described for the X centerline tracker, FIG. 8. Switch 270 and correction Wy (from FIG. 16) provide for coasting and scan disabling respectively.

Figure 15:
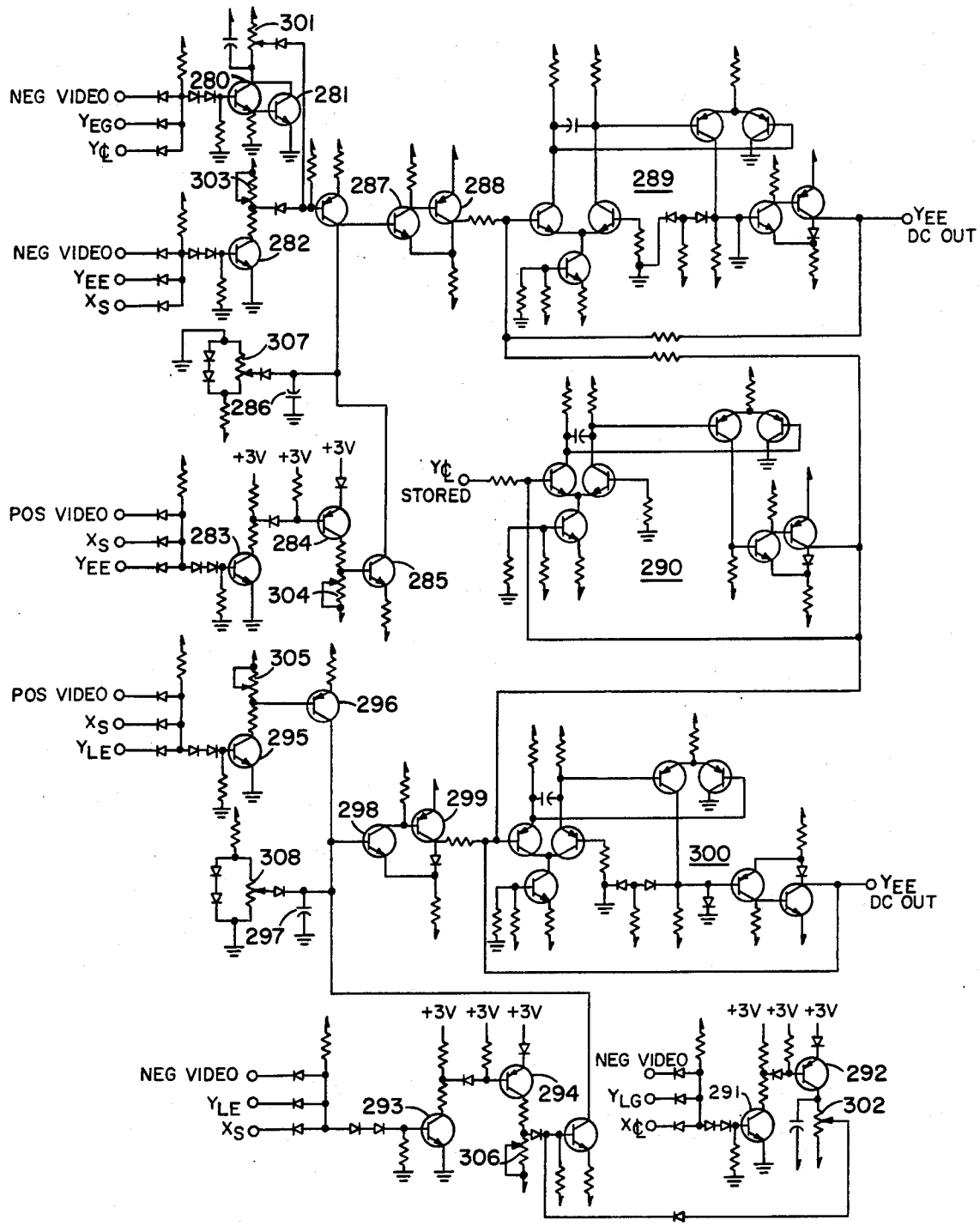
FIG. 15 is a schematic showing of the Y edge trackers.

The edge tracker is shown by FIG. 15. The early and late edges of the Y edge tracker are positioned at a point tangent to the target at the X centerline. The top edge is servoed by the Y early gate and early edge as described below. Transistors 280 and 281 provide closing drive during the simultaneous occurrence of negative video, Y early gate, and X centerline. This allows the edge to encompass the innermost contrast contour detail. An additional closing signal is available through transistor 282 during the simultaneous occurrences of negative video, Y early edge, and X sum. This closing drive, in conjunction with the opening drive of transistors 283–285 which occurs during the simultaneous occurrence of positive video, Y early edge, and X sum, allows the edge to assume a position tangent to the top of the selected contrast area. The early gate is closed by depositing charge on a storage capacitor 286 and is opened by removing charge from the capacitor. The resulting d-c level, buffered by transistors 287 and 288, serves as one input to an operational amplifier 289. Inverted Y centerline position, derived from amplifier 290, also serves as an input to the operation amplifier. The output of operational amplifier 289 thus references the edge position to that of centerline. The position of the bottom edge of the tracking window is controlled by the Y late gate and late edge signals as described below. Positioning of the bottom edge to the innermost contrast area is accomplished through transistors 291 and 292 during the simultaneous occurrence of negative video, Y late gate, and X centerline. Transistors 293 and 294 provide additional closing drive during the simultaneous occurrence of negative video, Y late edge, and X sum. This drive in conjunction with the opening drive from transistors 295 and 296 which occurs during the simultaneous occurrence of positive video, Y late edge, and X sum allows the edge to assume a position tangent to the bottom of the target. The d-c level on the storage capacitor 297, buffered by transistors 298 and 299, and the inverted Y centerline position serve as inputs to an operational amplifier 300. The output of operational amplifier 300 provides a late edge position referenced to that of centerline. Since both top and bottom edges are referenced to centerline, their required tracking rates are small since they need only accommodate for changes in target dimensions. Resistors 301 and 302 are adjusted to allow the tracking window to encompass only the innermost contrast area when the target is in the vicinity of similar contrast. Resistors 303 and 304 are adjusted to allow the early edge to assume a position tangent to the top of the target. Similarly, resistors 305 and 306 are adjusted to achieve a bottom edge tangential to the target. These latter adjustments should be verified by equating the rate of growth of the tracking window to that of the target while zooming the lens in on the target. The top and bottom minimum controls, provided by resistors 307 and 308, should be adjusted to provide a tracking window of the desired minimum size. This should be done after placing the crosshairs on an area of equal brightness, uniformly grey, and adjusting the appropriate video discriminator on the control panel to its most sensitive position.

Figure 16:
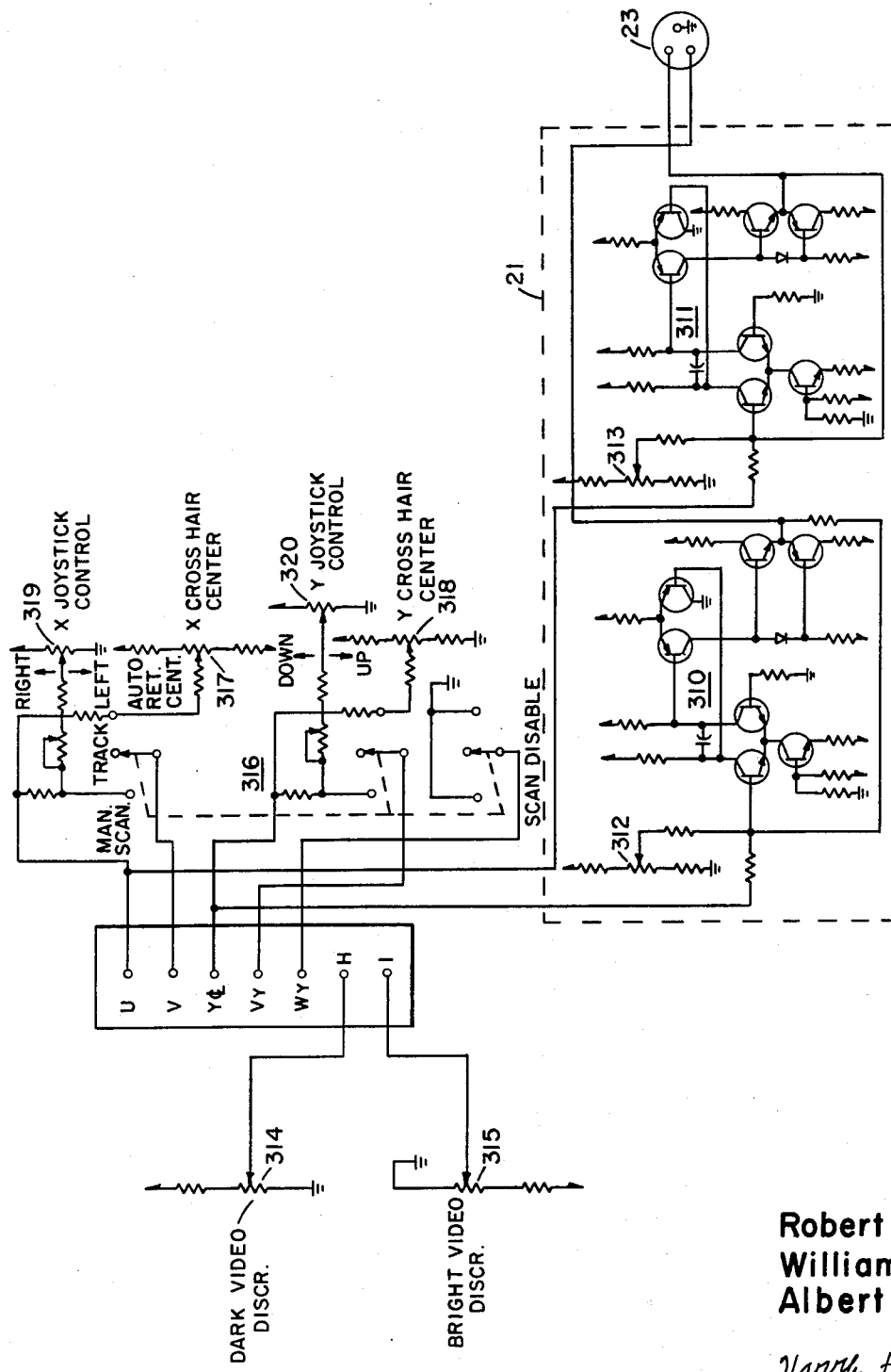
FIG. 16 is a schematic diagram of the control panel and error position detector circuits.

The control panel and error position detector are shown in FIG. 16. Orthogonal error signals are derived from two operational amplifiers 310 and 311. The outputs of these amplifiers are adjusted by resistors 312 and 313 to read zero volts in both axes when the target is centered in the field of view. A positive output of the X servo amplifier 311 will indicate a crosshair position to the right of center, whereas a negative output will indicate a crosshair position to the left of center. A positive output from the Y servo amplifier 310 will indicate a tracking position below center, whereas a negative output will indicate a tracker position above center. Adjustments of the video discriminator's comparison levels are made by resistors 314 and 315 of the control panel. The appropriate adjustable d-c level is compared with that of the clamped video at the video processor board in determining the contrast boundary. The dark discriminator adjustment is most sensitive in its maximum clockwise position; the comparison voltage at this point is ground. The discrimination may be desensitized by turning the control counterclockwise through a 0 to +1.5 volt range. The bright discriminator 315 is most sensitive in its extreme counterclockwise position; the comparison voltage at this point is ground. The discrimination level may be desensitized by turning the control in a clockwise manner through a 0 to −1.5 volt range. Control switch 316 has three positions which allow a manual scanning mode, a tracking mode, and a crosshair center mode. Positioning of the crosshairs may be done by the use of resistors 317 and 318. Manual servoing of the camera may be done by the use of a joy stick control which controls resistors 319 and 320.

While the invention has been described with references to a preferred embodiment thereof, it will be apparent that various modifications and other embodiments thereof will occur to those skilled in the art within the scope of the invention. Accordingly, it is desired that the scope of the invention be limited only by the appended claims.

We claim:

1. A system for tracking a target comprising:
a directional sensing means for sensing an image of at least a portion of the target, said sensing means having outputs which are video signals in accordance to the image sensed,
a video processor having inputs connected to outputs of said sensing means, said processor including means for clamping to ground the video signal at a predetermined position of a contrast area on the image,
circuit means connected to outputs of said processor so as to generate at its outputs, tracking gates about said contrast area,
tracking means connected to the outputs of said circuit means and said processor so as to track a center position of said contrast area and provide orthogonal error signals of the position of said contrast area, and
servoing means connected to said orthogonal error signals and to said directional sensing means for positioning the sensing means so that the image sensed will include said contrast area.

2. A system as set forth in claim 1, wherein said video processor further includes an adjustable contrast detector so as to allow discrimination of the contrast area from its background.

3. A system as set forth in claim 1, wherein said tracking means are made up of a plurality of tracking circuits so as to provide a tracking window about said contrast area.

4. A system as set forth in claim 3, further comprising a switching means connected to said plurality of tracking circuits so as deactivate selected tracking circuits.

5. A system as set forth in claim 4, wherein said video processor further includes an adjustable contrast detector so as to allow discrimination of the contrast area from its background.

6. A system as set forth in claim 5, further comprising a video mixer having inputs connected to said video processor, said circuit means, and said tracking means so as to have combined signal outputs which represent said image, said tracking window, and said orthogonal error signals.

7. A system as set forth in claim 6, further comprising a monitor means connected to the signal outputs of said video mixer so as to visually show said signal outputs.

8. A system as set forth in claim 7, wherein said directional sensing means is a vidicon camera mounted for movement.

9. A system as set forth in claim 8, further comprising a positioning means connected to said servoing means so as to position said camera to select said predetermined position.

10. A system as set forth in claim 9, wherein said circuit means and said tracking means are divided into two portions, one for sensing X coordinates and the other for sensing Y coordinates of the contrast area.

* * * * *